(12) United States Patent
Hoshiba et al.

(10) Patent No.: US 7,654,226 B2
(45) Date of Patent: Feb. 2, 2010

(54) ARTIFICIAL NIPPLE FOR EXPERIMENTAL ANIMALS

(75) Inventors: Junji Hoshiba, Okayama University, 5-1, Shikata-cho 2-chome, Okayama-shi, Okayama (JP) 700-8558; Masako Yajima, Kanagawa (JP)

(73) Assignees: Meiji Dairies Corporation, Tokyo (JP); Junji Hoshiba, Okayama (JP)

( * ) Notice: Subject to any disclaimer, the term of this patent is extended or adjusted under 35 U.S.C. 154(b) by 341 days.

(21) Appl. No.: 10/530,481

(22) PCT Filed: Oct. 3, 2003

(86) PCT No.: PCT/JP03/12709

§ 371 (c)(1),
(2), (4) Date: Apr. 6, 2005

(87) PCT Pub. No.: WO2004/030447

PCT Pub. Date: Apr. 15, 2004

(65) Prior Publication Data

US 2006/0042550 A1    Mar. 2, 2006

(30) Foreign Application Priority Data

Oct. 7, 2002    (JP) .............................. 2002-293275

(51) Int. Cl.
*A01K 9/00* (2006.01)

(52) U.S. Cl. .......................................... 119/71; 119/72

(58) Field of Classification Search .................... 119/71, 119/72, 72.5
See application file for complete search history.

(56) References Cited

U.S. PATENT DOCUMENTS

| 1,127,797 | A | * | 2/1915 | Moore | 119/71 |
| 2,307,220 | A | * | 1/1943 | Hewitt | 119/72.5 |
| 3,529,575 | A | * | 9/1970 | Schalk | 119/72.5 |
| 3,602,197 | A | * | 8/1971 | Fioretto | 119/72.5 |
| 3,698,685 | A | * | 10/1972 | Lang | 251/303 |
| 3,698,952 | A | * | 10/1972 | Rose-Miller | 134/22.1 |

(Continued)

FOREIGN PATENT DOCUMENTS

JP    56-104668    8/1981

(Continued)

OTHER PUBLICATIONS

Hoshiba, J., "Automatic Feeder for Newborn Rat Use Within 12 Hours of Birth," Contemporary Topics 1996;35(5):83-86.

*Primary Examiner*—David J Parsley
(74) *Attorney, Agent, or Firm*—Cermak Kenealy Vaidya & Nakajima LLP (57) ABSTRACT

An artificial nipple for an experimental animal can include a replaceable duct in a nipple and a structure that prevents liquid from accumulating in the nipple except in the nipple tip and the duct. The artificial nipple can be configured to prevent liquid from accumulating by filling the nipple with an elastic member or by forming the nipple with an elastic member integrally with an outer wall of the nipple.

21 Claims, 3 Drawing Sheets

U.S. PATENT DOCUMENTS

| | | | |
|---|---|---|---|
| 4,393,813 A * | 7/1983 | Sou | 119/72.5 |
| 5,010,847 A * | 4/1991 | Braden | 119/475 |
| 5,427,058 A * | 6/1995 | Chung | 119/72.5 |
| 5,494,000 A * | 2/1996 | Tanabe | 119/72.5 |
| 5,638,769 A * | 6/1997 | McIntyre et al. | 119/71 |
| 5,784,999 A * | 7/1998 | Larson et al. | 119/71 |
| 6,003,468 A * | 12/1999 | Edstrom et al. | 119/72.5 |
| 2003/0079692 A1 * | 5/2003 | Steudler et al. | 119/72.5 |

FOREIGN PATENT DOCUMENTS

| | | |
|---|---|---|
| JP | 3004319 | 11/1994 |
| JP | 63-24948 | 2/1998 |
| JP | 2710027 | 2/1998 |
| JP | 2001-299877 | 10/2001 |

* cited by examiner

A: Nipple For Mouse: Increase Size Of Nipple With Growth Of Mouse

B: Nipple For Rat: Increase Size Of Nipple With Growth Of Rat

Fig. 5  Weight Change In Breast-Fed Infant And Artificially-Suckled Infant

Fig. 6

ARTIFICIAL NIPPLE FOR EXPERIMENTAL ANIMALS

TECHNICAL FIELD

The present invention relates to an artificial nipple favorably used for giving a liquid feed or a test solution such as a drug solution to experimental animals voluntarily and orally, a feeding bottle designed to be favorably used in combination with the nipple, a liquid feeding device for experimental animals comprising the artificial nipple and the feeding bottle, and a method for using the same.

BACKGROUND ART

In development researches of pharmaceuticals, nutritional foods, and specified functional foods, and in a variety of basic researches, acquisition of data from experimental animals is essential work. Especially, mouse or rat infants correspond to human immature babies whose eyes and ears have not been opened, and have high sensitivity to drugs and the like because of their immature organs. Therefore, data of high accuracy is expected to be obtained from these animals.

When these experimental animals with a need for suckling such as infants are fed with e.g., milk, a compulsory feeding method is dominantly employed in which a feed is given to a gastrointestinal tract using a gastric probe or a catheter. This method must be employed because in giving milk or a test solution, it is necessary to control the dose amount or the dose interval depending on the purpose of the study. However, according to the above method, invasion to organisms, for example, abraded wounds on the pharynx or esophagus in the case of a gastric probe, and wounds created in attaching a catheter is inevitable. As a result, inflammations caused by damages to viscous walls result in data variation among individuals of experimental animals at higher possibility. In the situation that an experimental animal must take milk or a test solution voluntarily due to the purpose of the study, for example, for developing milk having a specific application, the method using a gastric probe or a catheter which is a compulsory administration method cannot be employed. Apart from the study purpose, use of a gastric probe or a catheter with respect to a mouse or rat infant having a body weight of less than 3 grams will inflict damages on a very soft pharynx, esophagus, or gastric wall by a probe needle or the like at very high possibility.

While accurate data is expected to be obtained by using mouse or rat infants for development of pharmaceuticals or specified purpose milk such as milk for immature baby, practically, there is no method for quantitatively feeding mouse or rat infants with milk or a test solution voluntarily and orally at a single dose or repeatedly in safety.

In the course of developing an administration method of liquid feed or the like to experimental animals, the inventors of the present application have developed an automated artificial feeding device for experimental animals that enables experimental animals to voluntarily drink milk via an artificial nipple or the like without using a gastric probe or the like. This is reported in CONTEMPORARY TOPICS in Laboratory Animal Science Vol. 35-5, p83-86 (1996).

The feature of the automated artificial feeding device lies in a structure of the artificial nipple. The artificial nipple has a double structure so as to prevent milk from leaking when an infant is not drinking the milk. An outer part of the nipple is formed with a cross cutting at its tip end, and an inner part of the nipple is formed with slits at four positions on its lateral side. Also an injection needle having a gauge of 24 to 26G excluding a needle point is inserted into the nipple. The inventors attempted to prevent milk from leaking and to control the flow by combination of these structural features.

Likewise the present invention, this automated artificial feeding device is also designed for an experimental animal to voluntarily stick to the artificial nipple and orally take a liquid feed or the like. However, this device still has the following problems.

1) The previous device is principally designed for rat infants, so that when it is used for mouse infants, it cannot follow the growth of the infant.

2) The above device fails to feed a test solution or the like in such a simple manner as giving milk to an infant while holding the device with hand as is necessary. Although the above device enabled voluntary feeding according to the own will of the rat infant, it is still difficult to give a test solution or the like regularly and quantitatively in a specifically controlled manner in practice of the experiment, for example, to give a test solution according to need.

3) Since the structure of the nipple of this device is too complicated as an artificial nipple for small animals such as mouse and rat, performance variation between nipples is easy to occur, and it is difficult to stabilize a feeding amount or the like.

The complicated structure of the previous artificial nipple was devised for preventing a liquid feed or the like from leaking from the nipple as described above. However, in order to stabilize the feeding amount and to further improve the reliability of the data, it is desired to develop a nipple which is simple in structure in order to replicate the nipples with ease and excellent in performance, a liquid feeding method for experimental animals that is designed to be suited to the nipple, and a device for implementing the same.

DISCLOSURE OF THE INVENTION

In consideration of the above, the inventors of the present application attempted to develop a liquid feeding device for experimental animals and a method of using the same, capable of feeding a liquid feed or a test solution regularly and quantitatively to experimental animals in a similar manner to breast feeding, by creating an artificial nipple capable of feeding a liquid feed or a test solution voluntarily and orally in a well-controlled manner even for the cases of very small experimental animals whose eyes and ears are still close, such as mouse infants, and a feeding bottle suited for use in combination with the artificial nipple. The technical problems to be solved by the artificial nipple, the liquid feeding device, and the liquid feeding method are summarized in the points A to D below.

A. Control of Outflow Degree of Liquid Feed or the Like.

The present invention targets various sizes of experimental animals from very small individuals such as mouse infants to individuals as large as ferrets, rabbits, and the like. For this reason, it is necessary to control the outflow degree of the liquid feed or the like accurately in accordance with the size and the condition of the experimental animal. If an excess amount of the liquid feed or the like goes out, it will enter a lung to cause a pneumonia, whereas if the outflow degree is not sufficient, the animal will rapidly stop drinking. When it is necessary to change the ingredients of the liquid feed or the like depending on the purpose of the study, the viscosity or the like of the feed or the like may be changed. In such a case, it is necessary to follow the change in fluidity of the feed or the like.

B. Prevention of Air Accumulation in a Stomach and Intestines.

When rodents such as mice and rats that are most commonly used as experimental animals are used as objects of the experiment, since mice and rats cannot produce a belch as a human being does because of its anatomical positional relationship of stomach, if a mouse or rat takes air at the time of suction-drinking the liquid feed or the like, the air accumulates in the stomach and intestines, to lead the death in most cases. Furthermore, since cutting teeth of rodents will grow permanently, when cutting teeth extend to some extent (about 10 days old), a space is easily created between the nipple and lips due to the extended cutting teeth as an obstacle, resulting that the animal easily suck air at the time of feeding or administration of a test solution. Therefore, an artificial nipple overcoming this problem is demanded.

C. Comprehension of Feeding Amount of Liquid Feed or the Like.

For research, it is necessary to comprehend the feeding amount of the liquid feed or the like accurately. It should be comprehended for individual experimental animal, and the comprehension should be realized simply during a feeding operation.

D. Artificial Nipple Should Have More Simplified Structure.

The structure of the artificial nipple should be simple but provide excellent performance in order to facilitate application to a very small nipple and reduce the variation in feature between individual nipples as small as possible from the view point of data comparison.

Regarding the point A, first, an artificial nipple has a duct which is replaceably inserted therein, and by replacing the duct with a duct of different bore diameter depending on the required flow rate. This makes the flow rate of the liquid feed or the like controllable. When it is necessary to control the flow rate more finely, a tube with calibrations is attached to the feeding bottle, thereby enabling fine adjustment of the flow rate by the height (drop difference) of the liquid feed or the like charged therein.

Secondly, by filling the nipple with silicone rubber, isoprene rubber, styrene-isoprene rubber, or a sponge-like elastic member derived therefrom, or forming integrally with the outer wall of the nipple, a structure that prevents the liquid feed or the like from accumulating in the nipple except in the nipple tip and the duct is realized. In this case, when it is formed integrally with the outer wall of the nipple, the nipple may not be filled with an elastic member and the interior may be hollow. These structures prevent the nipple from being crushed when an infant bites and sucks the nipple, and prevents the liquid feed or the like from rushing out at once. This eliminates the necessity of constructing the nipple into a double structure, and simplifies the structure of the nipple. The simplification of the structure can also overcome the problem D.

In order to achieve the prevention of liquid leaking and control of the flow rate more securely, the inventors prepared a mechanism that controls the liquid discharge rate by controlling the internal pressure of the closed system interior of the feeding bottle used in combination with the artificial nipple. Concretely, a liquid volume adjusting tube having a capacity smaller by 20-30% than an expected amount of liquid which an infant will drink at one time was attached to the feeding bottle. This liquid volume adjusting tube is designed to be crushed with almost no resistance in response to the suction-drinking action of the infant, and will not influence on the suction-drinking action of the infant. When the liquid volume adjusting tube is crushed, feeding of the liquid will be stopped. In this state, the liquid volume adjusting tube can be swollen by applying a pressure with hands, fingers, or the like on a pressurizing tube provided outside the feeding bottle. The infant is allowed to drink a liquid of the volume corresponding to the swollen volume.

After the infant stops drinking, if the pressurizing with hands or fingers is stopped, the internal pressure of the feeding bottle becomes negative, the liquid volume adjusting tube is crushed again, and the liquid is prevented from flowing out. As a result, it is possible to feed a liquid corresponding to the suction-drinking amount by an individual infant, while preventing a liquid from leaking.

Also it is possible to urge an infant to start suction-drinking with the use of a pressurizing tube. An infant starts suction-drinking in response to inflow of milk or the like rather than entry of a nipple into the mouth of the infant. Therefore, by applying a slight pressure on the pressurizing tube to cause a small amount of milk to flow out of the nipple, it is possible to reduce the time until the infant starts suction-drinking.

With the constitution as described above, the liquid feed or the like is directly given from the artificial nipple into the mouth of the experimental animal from the feeding bottle via the duct in the condition that the flow rate is controlled. The flow rate of the liquid feed or the like is first controlled by an inner diameter of the duct. Addition of the structure which prevents accumulation of liquid in the nipple suppresses undesired leaking of the liquid accompanying the suction-drinking action of the experimental animal. Then, by adding the mechanism that makes the internal pressure of the feeding bottle which is a closed system negative in response to the suction-drinking, the feeding amount of the liquid is controlled more finely and the liquid is prevented from leaking more securely.

In the present invention, when a check valve is attached in the feeding bottle, such a mechanism is not required in the artificial nipple so that the structure of the artificial nipple is simplified, and production, replacement, cleaning, or the like can be executed more easily. However, a check valve attached to the artificial nipple will not cause any problem in implementation of the present invention. In this case, there is no need to provide a check valve in the feeding bottle, however, the embodiment in which the check valve is provided in the feeding bottle is more preferably from the view point of production aspect and production cost of the artificial nipple regarding the problem of D.

Regarding the point B, in order to prevent air from accumulating in a stomach or intestines, fitting of the nipple to the mouth of a infant or the like is important. It is known that when an artificial nipple is used, an infant creates a negative pressure with its tongue and hard palate and swallows the liquid feed. However, in rodents, for example, when an infant becomes 10 days old, cutting teeth grow significantly and air is swallowed together because of the extended cutting teeth that form obstacles. For addressing this problem, the nipple is made larger in accordance with the growth of the infant so that the cutting teeth will not be obstacles, thereby making it easy to produce a negative pressure with the tongue and the hard palate (lips) as if a human sucks liquid with a straw, and preventing the air from entering. In the case of experimental animals other than rodents (for example, ferret), there arises a case that not only the size of the nipple but also the shape of the nipple should be changed in accordance with the shape of the mouth of that animal. Also in such a case, it is important to adopt a structure that prevents liquid from accumulating in the nipple, and by the help of this structure, it is possible to flexibly correspond to the change in shape of the nipple.

Regarding the point C, intake amount of the liquid feed or the like was comprehended by attaching a tube with calibrations into the feeding bottle. In addition to the calibrations, the tube has a movable mark. This movable mark can be used for comprehension of an intake amount by shifting the mark in accordance with the liquid level line when the liquid feed is continuously fed to a plurality of infants, or for indication of the maximum liquid level line when the liquid is injected into the feeding bottle. Further, for enabling selection of the tube diameter according to the size of the experimental animal, the tube itself is made replaceable. In addition to these structures, a spacer for replacement of tube is prepared separately.

Regarding the point D, as described in A, the structure that prevents liquid from accumulating in the nipple except in the nipple tip and the duct realized by filling the nipple with an elastic member or integrally forming the nipple with an elastic member is not only effective in simplification of the structure of the artificial nipple but also effective in preventing liquid from leaking when an experimental animal bites the nipple.

Through the above solving means, the inventors of the present application made it possible to establish and provide an artificial nipple favorably used in giving a liquid feed or the like to infants of experimental animals, in particular, mice and rats, voluntarily and orally, and a feeding bottle designed to use the artificial nipple in a favorable manner, a liquid feeding method for experimental animals comprising the artificial nipple and the feeding bottle, and a method thereof.

BEST MODE FOR CARRYING OUT THE INVENTION

Hereinafter, preferred embodiments of the present invention will be described in more detail with reference to FIGS. 1, 2, 3, and 4.

Figure 1:
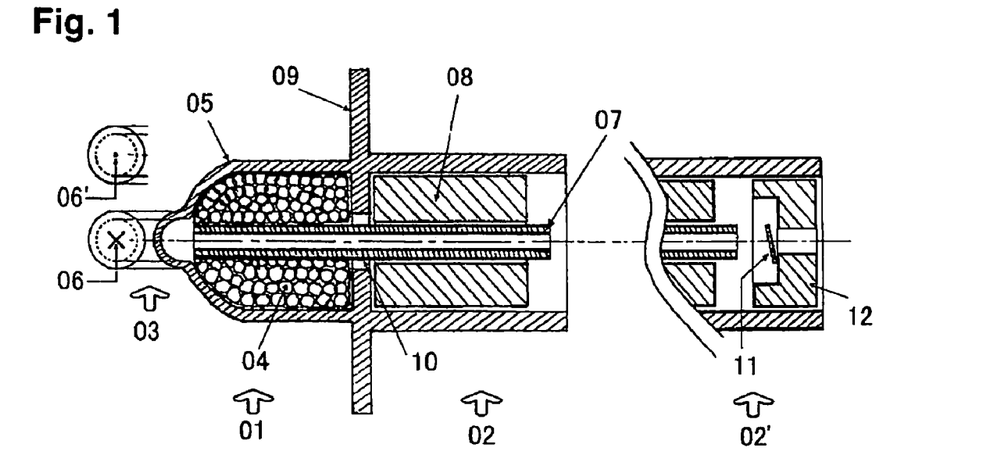
FIG. 1 is a cross-sectional view of an artificial nipple of the present invention.

FIG. 1 shows an artificial nipple of the present invention. In this drawing, the numeral 01 is an essential part of the artificial nipple including a silicone rubber outer wall, and a nipple and a nipple tip integrally formed with silicone sponge or its elastic member, and the numerals 02 and 02' represent a junction with a feeding bottle.

In the nipple tip 03, a notch indicated by 06 or a hole indicated by 06' is provided so as to feed a liquid in response to the sucking action of the animal. In the case of the notch 06, the strength of the sucking action by the animal gives a similar effect to changing the bore diameter, so that it is more suitably used in the artificial nipple of the present invention.

The inner diameter of the duct indicated by 07 to be attached may appropriately be changed in consideration of the objective experimental animal, its age, viscosity of the liquid feed and the like. The inner diameter may be, for example, 25G to 27G in gauge of injection needle, and this can control the degree of outflow of the liquid feed or the like. The length of the duct is for example 10 mm to 14 mm, although it differs depending on the size of the nipple.

The duct can be formed of any material that can keep the inner diameter, and such material may be appropriately selected from the hard tubular members used in solution sending purpose. A stainless tube commonly used as an injection needle is preferably used.

Since the diameter of the duct can be changed, the present invention can be appropriately applied to a variety of liquid feed or the like including those having low viscosity such as water, various aqueous solutions, and transfusion compositions, as well as those having high viscosity such as milk for experimental animals and enteral nutrients.

When a silicone outer wall is used in the nipple 05, the outer wall is about 0.1 to 0.4 mm thick. The inside of the outer wall is filled with an elastic member such as silicone sponge except in the nipple tip as is denoted by 04. By filling the nipple except in the nipple tip and the duct with the elastic member, a structure that prevents accumulation of liquid is realized. This is a solution for the problem that when an experimental animal bites the nipple in which a liquid feed or the like accumulates, the nipple is crushed and a large amount of liquid rushes out at once. The structure that prevents accumulation of liquid can advantageously prevent the liquid from leaking. The elastic member used herein may be of any materials lacking hygroscopicity and applicable to food containers or the like, and members formed of materials other than silicone and polymeric rubbers can also be used if they can give elasticity when made into a sponge-like structure.

When the artificial nipple is designed for repeated use, the outer wall and the filler are preferably made of materials that are resistive to heat sterilization. As such materials, isoprene, silicone, styrene-butadiene copolymer and the like rubbers, and sponges derived therefrom can be chosen. Among these, silicone foam is preferably used as a filler because its elasticity can be appropriately adjusted in a simple manner. When the artificial nipple is not used repeatedly, latex rubber is also excellent as a material for the nipple from the view point of ease of sucking by experimental animals.

In order to prevent the liquid feed or the like from counter-flowing, it is necessary to place a check valve. When the check valve is attached to the artificial nipple, it is placed together with a base 12 of, e.g., silicone rubber in the junction with the feeding bottle as indicated by 11 in FIG. 1. The check valve may be formed of materials having similar elasticity or moderate hardness compared to the elastic member used in the nipple, including elastomers such as silicone and polypropylene or hybrids thereof.

The numeral 08 denotes a supporting part of the duct formed of silicone rubber or the like, and is adapted to the diameter of the duct 07. The numeral 09 denotes a flange-shaped base part of the nipple which fixes the artificial nipple when joined to the feeding bottle. The numeral 10 denotes an allowance provided so as to follow the variable diameter of the duct 07.

Figure 4:
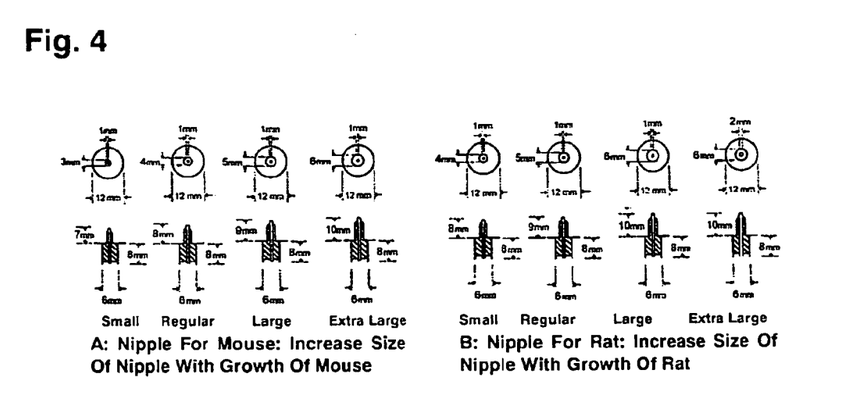
FIG. 4 is a view showing an example in which the artificial nipple is changed depending on the size of the experimental animal.

Four artificial nipples designed for each of mouse and rat shown in FIG. 4 are formed into four different sizes, i.e., small, regular, large, and extra large, respectively and they can be appropriately selected depending on the age and size of the experimental animal. By attaching an artificial nipple which is suited to the size of mouth of the experimental animal to the feeding bottle in any time, it is possible to prevent air from being sucked during the feeding. The values indicated in FIG. 4 are given just for reference, and are not limitative.

As described above, according to the present invention, it is possible to prepare an artificial nipple which is fitted to the mouth shape of the animal depending on the size and situation of the animal. This is one of the features of the present invention. Therefore, the present invention is applicable to a variety of experimental animals including relatively large experimental animals such as rabbit and experimental animals having a different mouth shape from that of the rodent such as ferret, as well as mouse, guinea pig, and rat.

Figure 2:
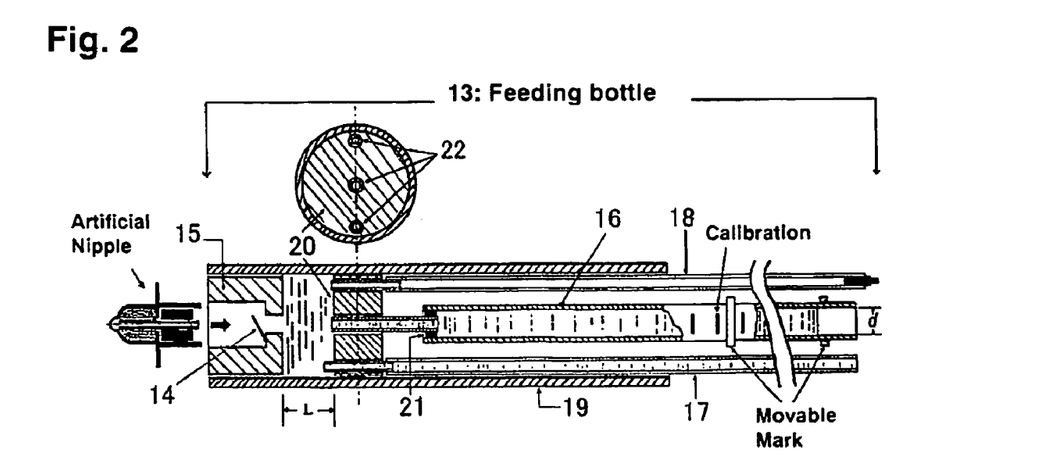
FIG. 2 is a partial cross-sectional view of a feeding bottle of the present invention.

In one embodiment, the feeding bottle of the present invention has a check value 14 in FIG. 2. When the feeding bottle is combined with the artificial nipple not having a check valve shown in FIG. 1, more excellent feature is realized by the article of the present invention. To be more specific, the structure of the artificial nipple is simplified, and production of the artificial nipple is facilitated. In association with this, nipples of different sizes can be readily prepared, and the feeding condition can be changed so as to be suited for various purposes only by changing the artificial nipple that is suited for the condition, which is more suitable for the object of the present invention. Also an advantage is provided that recycling by cleaning of the artificial nipple is facilitated. However, when the size of the artificial nipple is relatively large, or when no significant problem arises in production or handling thereof, the constitution providing a check value in the artificial nipple as indicated by 11 in FIG. 1 does not cause any problem in implementation of the present invention.

The article of the present invention has the following excellent feature by having a replaceable tubular structure in the feeding bottle as indicted by 16 in FIG. 2.

In brief, since the tube is replaceable, even when the size of the animal is changed from mouse to rat, the same feeding bottle can be used both for rat and mouse by changing the tube via a spacer 21. By preparing spacers of different diameter, tubes of different diameters can be joined to only one feeding bottle having an outer wall 19.

When the tube has calibrations, the amount of the liquid feed that is actually given or administered to the experimental animal can be readily measured for individual animals. In this case, in addition to the calibration written to the tube as indicated by 16 in FIG. 2, a movable mark formed of silicone rubber or various resins may be attached. By moving the movable mark in accordance with the feeding amount for each infant, it is possible to measure the intake amount of the liquid feed more accurately. This movable mark can be formed into a ring, for example, and a required number of movable marks can be fit around the tube.

Any materials having such transparency that allows checking of the content and having such hardness that allows measurement can be used for the tube, and for example, glass, polypropylene, polycarbonate, methylpentene resin, or silicone rubber that is commonly used for a tube for injection can be used.

By making the diameter "d" at the joint between the tube and the feeding bottle in the tube coincide with the diameter of an insertion port of the feeding bottle, it is possible to facilitate replacement of the tube. In this case, the spacer 21 is not necessary. The "d" is set from the view point of check of the liquid level and in accordance with the intake amount of the feed of the animal. For example, in the case of a mouse, a tube having "d" of about 3 mm may be used.

An artificial nipple joint base 15 and a duct supporter 20 shown in FIG. 2 are formed of rubber or the like and have detachable structures. Therefore, not only cleaning and repair of the feeding bottle, but also changing of size and material of each part depending on the experimental animal can be readily conducted.

The numeral 18 denotes a tube used for air vent and cleaning of feeding bottle, and the numeral 17 indicates a tube through which a liquid feed or the like is introduced. These tubes can be formed of similar materials as described above for the tube. The numeral 22 denotes a tube for junction which facilitates detachment of the tube or the like, and is implemented by a stainless tube or the like.

The length of each part of the feeding bottle shown by 13 in FIG. 2 can be appropriately changed depending on the use method and purpose. For example, the length L in FIG. 2 is about 100 mm in the case of a mouse infant, however, it may be selected longer when the ability of drinking milk of the animal is higher.

Figure 3:
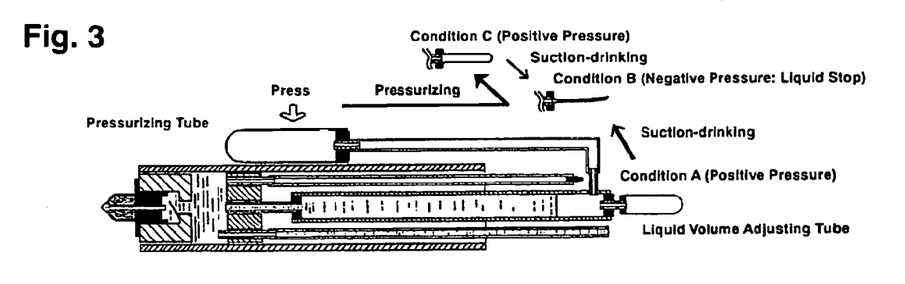
FIG. 3 is a cross-sectional view showing a mechanism for controlling the internal pressure of the feeding bottle.

As one embodiment, the feeding bottle of the present invention has a fine adjustment mechanism of flow rate as shown in FIG. 3. The fine adjustment mechanism of flow rate is implemented by attaching to the feeding bottle of FIG. 2, a liquid volume adjusting tube having a capacity smaller by 20-30% than an expected amount of liquid which an infant will drink at one time and a pressurizing tube and making the interior of the feeding bottle a closed system. The internal pressure was adjusted with these two tubes, whereby supply of liquid in accordance with the suction-drinking amount by the infant, prevention of leak of the liquid and urging to start suction-drinking are simultaneously realized.

In brief, when milk or the like is fed and the infant takes the artificial nipple in its mouth, a slight pressure is applied on the pressurizing tube with hands or fingers for giving milk or the like to cause a small amount of the milk or the like to flow out of the nipple tip of the artificial nipple. This urges the suctioning and drinking action of the infant and the infant rapidly starts suction-drinking. With this mechanism, it is possible to significantly reduce the waiting time until the infants voluntarily starts suction-drinking. As the infant sucks and drinks, the internal pressure of the feeding bottle becomes negative, and the liquid volume adjusting tube turns into the a condition B from a condition A shown in FIG. 3 to stop feeding of the milk or the like. At this point, if further suction-drinking action of the infant is observed, the pressurizing tube is pressed with hands or fingers to make the liquid volume adjusting tube into a condition C, thereby allowing suction-drinking again. As the infant suction-drinks again, the liquid volume adjusting tube turns to the condition B again to stop feeding of the liquid. With this mechanism, it is possible to correspond to differences in suck-drinking amount of individual infant more finely, and to prevent the liquid from leaking more securely. When another infant is fed subsequently, the feeding bottle is made into an open system, and then the liquid adjusting tube is returned to the condition A.

In order to realize the above configuration, the liquid volume adjusting tube has such a thickness that the tube will be crushed with no resistance for avoiding influence on suction-drinking of the infant. When the material is silicone rubber, the thickness is approximately 0.05 mm, for example, and this thickness is the minimum for maintaining the shape. The pressurizing tube and the connecting tube may have such thicknesses that the tubes will not be crushed at a negative pressure generated when an infant drinks milk or the like. When the material is silicone rubber, the thickness is about 0.5 mm, for example.

The materials for the pressurizing and connecting tubes may be any materials insofar as they can realize the aforementioned functions and are resistant to heat sterilization, and isoprene rubber, polypropylene rubber and the like can be exemplified. However, it is to be noted that the required thickness differs depending on the material. These tubes can be joined via a stainless tube or the like which is heat-sterilizable in consideration of replacement or the like of the tubes. Likewise the case of the tube with calibrations, by using a spacer, it is possible to readily replace tubes of different diameters.

A liquid feeding device for experimental animals having the excellent features as described above, enabling voluntary and oral feeding of a liquid feed or the like to an experimental animal such as mouse or rat in a suckling period which corresponds to an immature baby of human being, and enabling regular and quantitative feeding of a liquid with being held by a hand is not known up to now, and is first realized by the present invention. The artificial nipple, the feeding bottle suited for use in combination with the artificial nipple, a liquid feeding device for experimental animals comprising the artificial nipple and the feeding bottle, and a liquid feeding method for experimental animals in which the artificial nipple in the device is changed in accordance with the condition of the experimental animal have many excellent features.

Efficacy of the present invention will be explained based on the test examples, however, the present invention is not limited to these test examples.

TEST EXAMPLE 1

Artificial suckling of mouse using an artificial nipple and a feeding bottle for mouse; realization of growth by voluntary suckling of infant Test method: With respect to home-bred and naturally born BALB/C mice at one day old, artificial suckling using a nipple of small size for mouse and a feeding bottle of the present invention was started. A nursing cage for artificial suckling was kept warm on a commercially available hot carpet. In the warm cage laid with chips a bamboo bag was placed, and a mouse infant was accommodated therein. Chips outside the bamboo bag were occasionally poured with water so that moisture was always kept. Before starting the artificial suckling, mice were separated from their parent for 3 to 4 hours. Artificial milk was prepared by dissolving 3.8 g of dog milk in 10 mL of warm water. After introducing the milk into the feeding bottle equipped with the artificial nipple by means of a pump, heat was applied for about 3 to 5 minutes while the feeding bottle was inserted into a copper tube that is warmed under reflux by warm water. Heat application was conducted every time or optionally as necessary before suckling each infant. Milk was fed five or six times, or four or five times at 10 days old or later in the term between 8:00 a.m. and 10:00 p.m. The intake amount of the milk was determined by measuring a reduced amount of milk in the tube (length of tube: cm) in the feeding bottle between before and after suckling, and measuring body weight of infant before and after the suckling. In artificially suckled infants, sucking was not allowed from 10:00 p.m. to 8:00 a.m. next morning. The artificially suckled infants were kept in group, and were not returned to breast feeding. Micturition and bowel movement were urged by gently press the upper abdomen and back of the bladder several times per day as was necessary. Infants of breast-feeding group were fed together with the mother animal in usual conditions in a normal cage.

Figure 5:
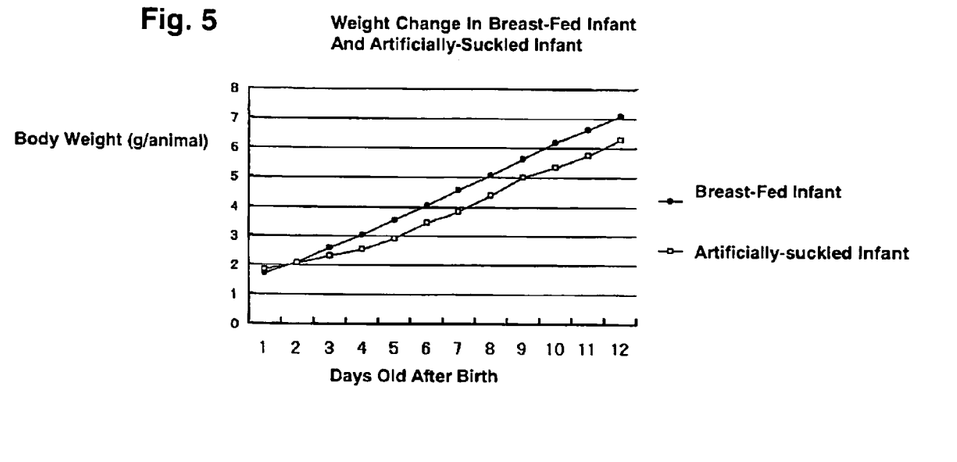
FIG. 5 is a view showing results of the test example in which mouse infants are artificially suckled using an article of the present invention.

Results of Experiments: The Results are Shown in FIG. 5

Although the artificially suckled infants were inferior in growth rate to the breast-fed infants, they continuously took the artificial milk voluntarily at the time of feeding and all of them grew without any dropout.

TEST EXAMPLE 2

A certain amount of test solution was orally administered using the article of the present invention in place of a gastric probe, and the influence on the growth of mouse infant exerted by the administration of test solution by the present invention was examined.

Test method: 3 BALB/C mice at 12 days of pregnancy purchased from JAPAN SLC were allowed to naturally bear in a stainless cage with a clean cap. In 24 hours after bearing, infants were divided into two groups for each parent, and combined so that each group equally contains infants from respective parents. Two parents each were made to feed a total of 8 infants. The test solution used in this experiment was as follows. 0.5% fructooligosaccharide-0.2 M-sucrose aqueous solution was uses as a test solution. The test solution was introduced into the feeding bottle for mouse of the present invention using a disposable injector with a sterilized tapered tip, and kept warm for 4 minutes in an incubator at 50° C. The mouse infants were separated from the parent at 1 day and 2 days, and kept warm for 2 hours in a plastic cage floating in a water bath at 43° C. When a mouse infant drank 0.7 cm by calibrations on the feeding bottle for mouse (about 50 µL) of test solution from an artificial nipple of small size for mouse of the present invention, the nipple was immediately removed from the mouth. Then the same amount of 0.2M-sucrose aqueous solution was made to drink. This allowed accurate determination of the drinking amount of the test solution. The control group was made to drink 0.2M-sucrose aqueous solution in the same manner. After administration of the test solution, the mouse infants were immediately returned to the cage of its mother (feeding mother).

Figure 6:
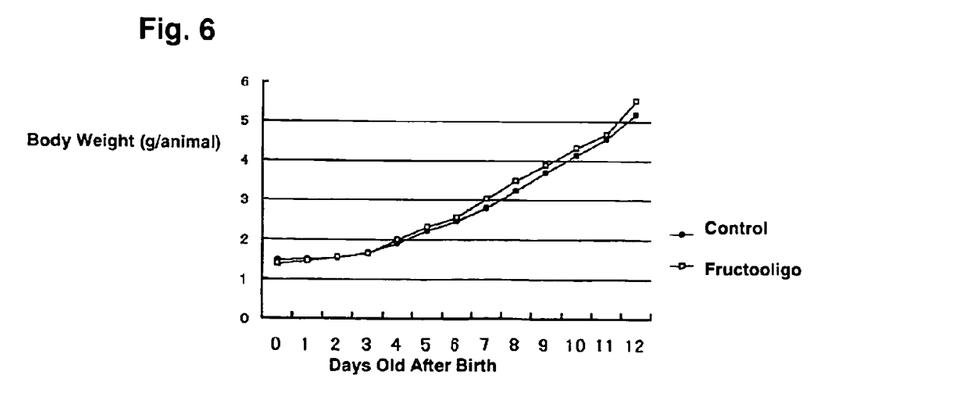
FIG. 6 is a view showing results of the test example in which mouse infants are orally and voluntarily administered with a test solution.

Results of experiment: Growth curves of infants are shown in FIG. 6. The mouse infants orally administered with the test solution using the article of the present invention normally grew.

It was confirmed that in experimental systems for examining influences of orally administered drugs or the like, the article of the present invention can be effectively used even for the experimental animals such as mouse or rat infants for which use of a gastric probe and a catheter is difficult.

INDUSTRIAL APPLICABILITY

As is apparent from the results of the test examples and the like, by the artificial nipple, the feeding bottle suited for use with the artificial nipple, the liquid feeding device for experimental animals comprising the artificial nipple and the feeding bottle, and the liquid feeding method for experimental animals in which the artificial nipple in the above device is replaced in accordance with the condition of the experimental animal, voluntary intake of liquid feed or the like by experimental animals is enabled, and artificial suckling of mouse infant or the like corresponding to a human immature baby whose eyes and ears are not open is enabled. Such artificial suckling was almost impossible up to now. Further, since the present invention made it possible to administer a variety of test solutions to mouse or rat infants voluntarily and orally, it is possible to evaluate the effect of orally administered various test solutions in a natural manner for animals in suckling period which have not been realized regardless of their high sensitivity to drugs and usability as experimental systems. This made it possible to develop new drugs and foods for immature babies and for infants that have not been developed yet.

The invention claimed is:

1. An artificial nipple for an experimental animal comprising:
    a nipple made of a material and configured to be elastically deformable such that an interior volume of the nipple is changed when the nipple is sucked by the animal, the nipple including a first concave portion having a first larger diameter and a concave tip portion having a smaller diameter forming a reservoir;
    a replaceable duct located in the nipple; and
    a structure that prevents a liquid from accumulating in the nipple except in a nipple tip and the duct, wherein the structure that prevents the liquid from accumulating includes at least one of a separate elastic member and an elastic member formed integrally with an outer wall of the nipple, and wherein the duct is located entirely within the nipple, the duct including an outlet end located within the nipple to define the nipple tip portion between the outlet end of the duct and the nipple.

2. The artificial nipple for an experimental animal according to claim 1, wherein a check valve is provided in a joint part with a feeding bottle.

3. A liquid feeding device for an experimental animal, wherein the artificial nipple according to claim 1 is attached to a feeding bottle including therein a replaceable tube, wherein the tube is marked with calibrations for measurement and/or a movable mark.

4. A feeding bottle for an experimental animal used in combination with the artificial nipple of claim 1, the feeding bottle comprising a replaceable tube.

5. The feeding bottle for an experimental animal according to claim 4, wherein the tube is marked with calibrations for measurement and/or a movable mark.

6. The feeding bottle for an experimental animal according to claim 4, comprising a check valve.

7. The feeding bottle for an experimental animal according to claim 5, comprising a check valve.

8. The feeding bottle for an experimental animal according to claim 4, comprising a mechanism by which a liquid stops flowing when an experimental animal drinks a predetermined amount or a certain amount of the liquid and thereby the internal pressure of the feeding bottle becomes negative.

9. The feeding bottle for an experimental animal according to claim 5, comprising a mechanism by which a liquid stops flowing when an experimental animal drinks a predetermined amount or a certain amount of the liquid and thereby the internal pressure of the feeding bottle becomes negative.

10. The feeding bottle for an experimental animal according to claim 6, comprising a mechanism by which a liquid stops flowing when an experimental animal drinks a predetermined amount or a certain amount of the liquid and thereby the internal pressure of the feeding bottle becomes negative.

11. The feeding bottle for an experimental animal according to claim 7, comprising a mechanism by which a liquid stops flowing when an experimental animal drinks a predetermined amount or a certain amount of the liquid and thereby the internal pressure of the feeding bottle becomes negative.

12. The feeding bottle for an experimental animal according to claim 11, comprising a mechanism by which the experimental animal is allowed to voluntarily drink the liquid again upon application of a pressure from outside the feeding bottle after the liquid stops flowing when the experimental animal drinks the predetermined amount or the certain amount of the liquid and thereby the internal pressure of the feeding bottle becomes negative.

13. A liquid feeding device for an experimental animal, wherein the artificial nipple according to claim 1 is attached to a feeding bottle that includes therein a replaceable tube, and the tube is marked with calibrations for measurement and/or a movable mark, and the feeding bottle includes a check valve.

14. A feeding bottle for an experimental animal, comprising:
    a feeding bottle;
    an artificial nipple for an animal separate from and connectable to the feeding bottle including
        a nipple made of a material and configured to be elastically deformable such that an interior volume of the nipple is changed when the nipple is sucked by the animal, the nipple including a first concave portion having a first larger diameter and a concave tip portion having a smaller diameter forming a reservoir;
        a replaceable duct located in the nipple; and
        a structure that prevents a liquid from accumulating in the nipple except in a nipple tip and the duct, wherein the structure that prevents the liquid from accumulating includes at least one of a separate elastic member and an elastic member formed integrally with an outer wall of the nipple, the duct including an outlet end located within the nipple to define the nipple tip portion between the outlet end of the duct and the nipple.

15. The feeding bottle for an experimental animal according to claim 14, wherein the tube is marked with calibrations for measurement and/or a movable mark.

16. The feeding bottle for an experimental animal according to claim 14, comprising a check valve.

17. The feeding bottle for an experimental animal according to claim 14, comprising a mechanism by which a liquid stops flowing when an experimental animal drinks a predetermined amount or a certain amount of the liquid and thereby the internal pressure of the feeding bottle becomes negative.

18. The feeding bottle for an experimental animal according to claim 17, comprising a mechanism by which the experimental animal is allowed to voluntarily drink the liquid again upon application of a pressure from outside the feeding bottle after the liquid stops flowing when the experimental animal drinks the predetermined amount or the certain amount of the liquid and thereby the internal pressure of the feeding bottle becomes negative.

19. The feeding bottle for an experimental animal according to claim 15, comprising a check valve.

20. An artificial nipple for an experimental animal comprising:
    a nipple made of a material and configured to be elastically deformable such that an interior volume of the nipple is changed when the nipple is sucked by the animal;
    a replaceable duct located in the nipple; and
    a structure that prevents a liquid from accumulating in the nipple except in a nipple tip and the duct, wherein the structure that prevents the liquid from accumulating includes at least one of a separate elastic member and an elastic member formed integrally with an outer wall of the nipple, and wherein the duct is located entirely within the nipple, the duct including an outlet end located within the nipple to define the nipple tip portion between the outlet end of the duct and the nipple, and the elastic member includes a first elastic member portion that surrounds the duct and a second elastic member portion that surrounds the duct, and the first elastic member portion is separated from the second elastic member portion by a flange.

21. A feeding bottle for an experimental animal, comprising:
- a feeding bottle;
- an artificial nipple for an animal separate from and connectable to the feeding bottle including
  - a nipple made of a material and configured to be elastically deformable such that an interior volume of the nipple is changed when the nipple is sucked by the animal;
  - a replaceable duct located in the nipple; and
- a structure that prevents a liquid from accumulating in the nipple except in a nipple tip and the duct, wherein the structure that prevents the liquid from accumulating includes at least one of a separate elastic member and an elastic member formed integrally with an outer wall of the nipple, the duct including an outlet end located within the nipple to define the nipple tip portion between the outlet end of the duct and the nipple, and the elastic member includes a first elastic member portion that surrounds the duct and a second elastic member portion that surrounds the duct, and the first elastic member portion is separated from the second elastic member portion by a flange.

* * * * *